United States Patent Office 3,545,985
Patented Dec. 8, 1970

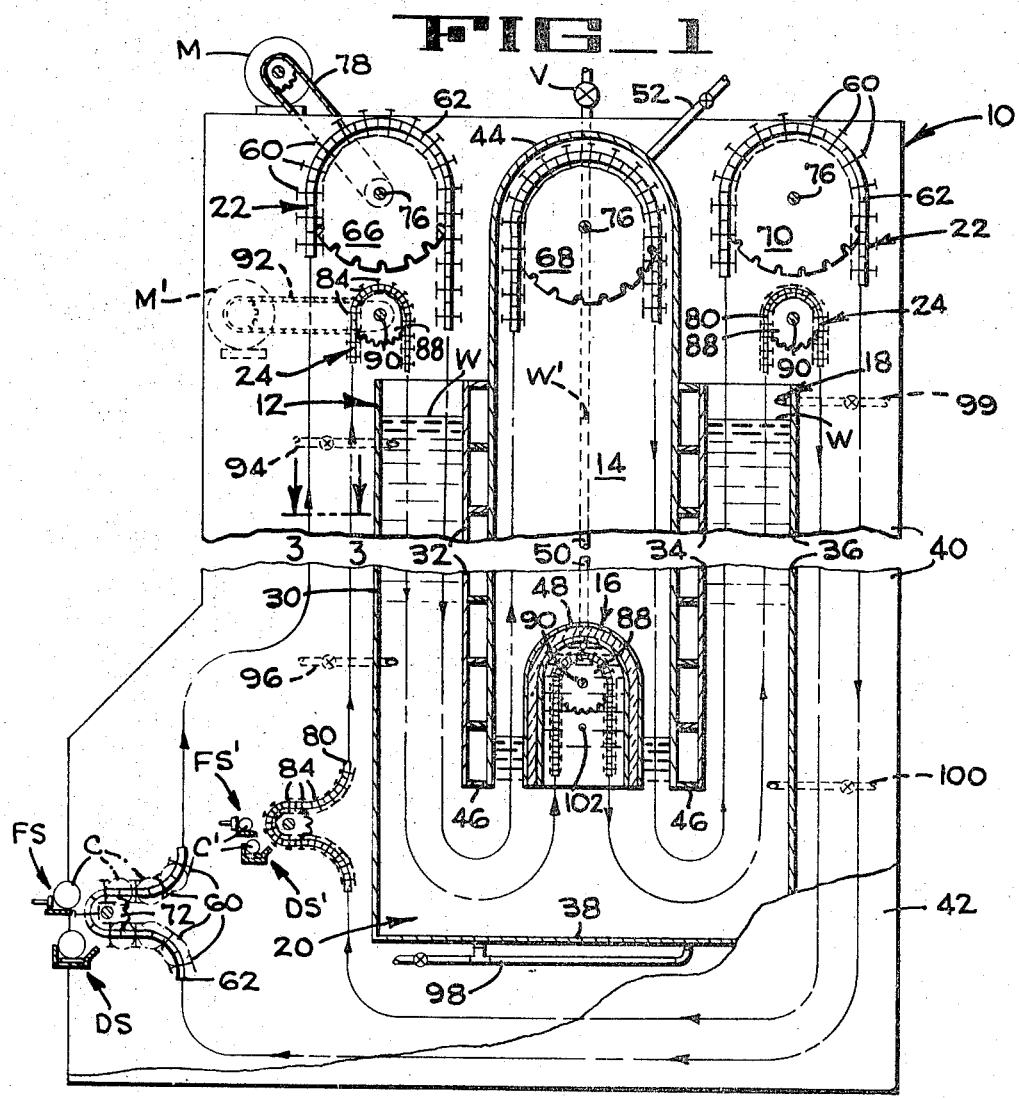

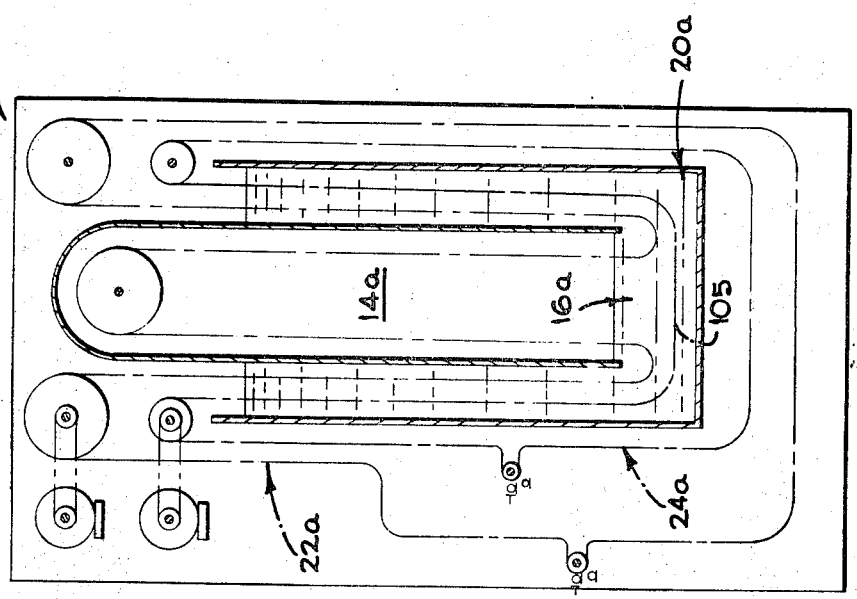
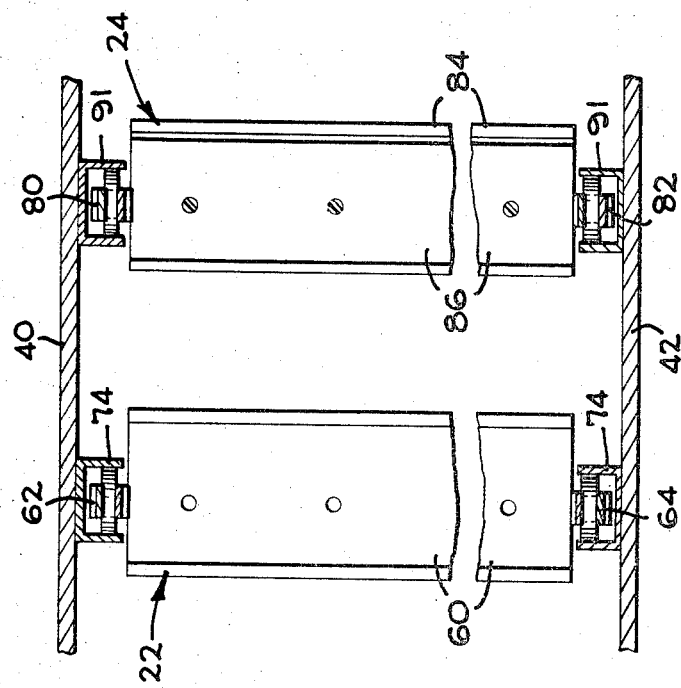
INVENTORS
SAMUEL A. MENCACCI
EMILE DE BRUYN
BY *F. W. Anderson*
*C. E. Tripp*
ATTORNEYS

---

3,545,985
DOUBLE CHAIN HYDROSTATIC COOKER AND STERILIZING PROCESS
Samuel A. Mencacci, Antwerp, and Emile de Bruyn, St. Niklaas-Waas, Belgium, assignors to International Machinery Corporation S.A., St. Niklaas-Waas, Belgium, a Belgian corporation
Filed Feb. 20, 1969, Ser. No. 800,939
Int. Cl. A23l 3/04
U.S. Cl. 99—214                                  19 Claims

ABSTRACT OF THE DISCLOSURE

A hydrostatic cooker and process for simultaneously sterilizing two products at different temperatures and having two processing conveyors which pass through common inlet and outlet hydrostatic legs of the cooker. One of the processing conveyors passes through a cooking chamber having a gaseous heat treatment medium therein maintained at a high temperature and pressure, while the other conveyor passes through a second cooking chamber having a cooking liquid therein maintained at a high pressure but at a lower temperature. The carriers on the two conveyors may be of different sizes so as to accommodate containers of different sizes.

BACKGROUND OF THE INVENTION

Field of the invention

This invention pertains to an improved hydrostatic cooker of the double chain type which is arranged to simultaneously process two types of food products at different temperatures.

Description of prior art

Because hydrostatic cookers are necessarily quite large and expensive, it is desirable that such cookers be as versatile as possible so that the canners may use the same cooker for many different products and also for many different container sizes. U.S. Pat. No. 3,286,619 to Lee which issued on Nov. 22, 1966 discloses a double chain hydrostatic cooker which approaches the versatility desired by the canners. The Lee cooker is designed to permit a single hydrostatic cooker to simultaneously process two similar types of products in different size containers. The Lee cooker also permits the residence time of the two types of products, or the same product in different size containers, to vary to a certain extent. However, in the Lee cooker both conveyors pass through the same cooking chamber and accordingly the containers carried by the two conveyors are subjected to the same processing temperatures.

SUMMARY OF THE INVENTION

In accordance with the present invention the cooking temperature of the containers supported by one of the conveyors is higher than the cooking temperature of the containers supported by the other conveyor. The residence time within the cooker of the containers that are subjected to the higher temperature is normally considerably greater than the residence time of the containers subjected to the lower cooking temperature, although it will be understood that such residence times may be varied considerably by independently controlling the speed of movement of the conveyors so as to conform to the specific cooking and sterilizing requirements of the particular food product being processed.

BRIEF DESCRIPTION OF THE DRAWINGS

FIG. 1 is a diagrammatic elevation of a first embodiment of the double chain hydrostatic cooker of the present invention, major portions of the cooker being shown in vertical section and other portions of the cooker being cut away.

FIG. 2 is an enlarged diagrammatic vertical section through the two conveyors illustrating the cross sectional shapes of different sizes of carriers on the conveyors.

FIG. 3 is an enlarged horizontal section taken along lines 3—3 of FIG. 1 looking downwardly upon the two carriers illustrated in FIG. 2, the central portion of the carriers being cut away.

FIG. 4 is a diagrammatic vertical central section of a second embodiment of the cooking apparatus of the present invention.

DESCRIPTION OF PREFERRED EMBODIMENTS

In general, the double chain hydrostatic cooker 10 (FIG. 1) of the present invention comprises a hydrostatic inlet or preheating leg 12, a steam chamber 14, a hot water cooking chamber 16, and a hydrostatic discharge or cooling leg 18. The steam chamber 14 and water chamber 16 communicates with both legs 12 and 18 through a trough 20. A long endless processing conveyor 22 is trained through the hydrostatic legs 12 and 18 and through the steam chamber 14, and the short endless conveyor 24 is trained through the legs 12 and 18 and through the water chamber 16. It will be understood that a portion of the trough also forms a part of the hot water cooking chamber.

More specifically, the inlet hydrostatic leg 12, the discharge hydrostatic leg 18 and the trough 20 are defined by vertical transverse walls 30, 32, 34 and 36 and a floor 38 which are welded to side walls 40 and 42 to provide a fluid tight housing. The steam cooking chamber 14 is defined by an inverted U-shaped housing 44 that is welded in fluid tight engagement to the side walls 40 and 42 and has its lower extremities spaced from the floor 38 and connected in fluid tight engagement to the lower ends of the walls 32 and 34, which lower ends are also spaced from the floor 38, by horizontal walls 46. The hot water cooking chamber 16 is primarily defined by an inverted U-shaped housing 48 comprising a suitable insulating material sandwiched between two metal walls, which walls are secured in fluid tight engagement to the side walls 40 and 42. A vent pipe 50 is connected to the upper portion of the hot water chamber 16 and extends upwardly to a height which is at least equal to the height of the water legs 12 and 18 thereby defining a third hydrostatic leg.

The hydrostatic inlet leg 12, discharge leg 18, trough 20 and hot water cooking chamber 16 are filled with a liquid, preferably water. The steam cooking chamber 14 is filled from a valved and thermostatically controlled supply conduit 52 with a gaseous cooking medium, such as steam or a steam-air mixture, at a superatmospheric pressure sufficient to maintain the water in the hydrostatic legs and trough at the levels W and W' as indicated in FIG. 1.

The long conveyor 22 (FIGS. 1, 2 and 3) has a plurality of elongated, evenly spaced T-shaped carriers 60 secured thereto and adapted to handle long rows of relatively large containers C. The carriers 60 are secured to two endless chains 62 and 64 (FIG. 3). The chains are guided along a zig-zag path through the cooker by pairs of large diameter sprockets 66, 68 and 70, a pair of small diameter sprockets 72 and guide tracks 74 (FIG. 2) secured to side walls 40 and 42. The pairs of sprockets are keyed to shafts 76, and at least one of the shafts is connected to a variable speed drive motor M by a chain drive 78. As is well known in the art, rows of containers are fed into the carriers 60 at a feed station FS and after being processed, are discharged from the carriers at a discharge station DS.

The short conveyor 24 comprises a pair of spaced chains 80 and 82 (FIG. 3) having a plurality of evenly spaced elongated carriers 84 secured thereto. As illustrated in FIGS. 2 and 3, the carriers 84 are smaller than the carriers 60, and accordingly, will handle a smaller size range of containers such as containers C'. Also, if it is desired to handle containers of a still smaller size, such as containers C'', adapters 86 are bolted to the carriers 84.

As shown in FIG. 1, the conveyor 24 is trained around pairs of sprockets 88 keyed to shafts 90 and is guided by tracks 91 (FIG. 3). A variable speed motor M' is connected to one of the shafts 90 by a chain drive 92 and drives the conveyor 24 at a speed independent of the speed of the long conveyor 22. Rows of containers C' or C'', depending upon whether or not the adapters 86 are being used, are fed into the carriers 84 at a feed station FS' and after being processed are discharged at a discharge station DS'.

As is well known in the art, the water in the inlet or preheating leg 12 and trough 20 is heated and thermostatically controlled by steam or the like from valved steam conduits 94, 96 and 98 to provide a temperature gradient from the upper end of the inlet leg to the steam chamber 14. The temperature of the water gradually increases from about 160° F. at the upper end of the inlet leg to about 180° F. at the bottom of the trough 20. The temperature immediately below the lower water level W' is about 235° F. when the sterilizing temperature in the steam chamber 14 is 250° F. As is well known in the art, such gradual increase of temperature minimizes injury to the containers, especially if the containers are glass jars, or are thin metal or plastic containers. The water in the cooling leg 18 gradually decreases in temperature, in response to the addition of cooling water from valved inlet conduit 99 and controlled drainage of hot water from the discharge leg through valved drain conduit 100. This temperature varies from about 235° F. immediately below the water level W' to a temperature of about 85° F. to 100° F. at the upper end of the discharge water leg.

As mentioned above, although the temperature of the steam in the steam chamber is about 250° F., the temperature immediately below the water level at W' is on the order of about 235° F. The water temperature rapidly drops below this level so that at a point about one foot below W' the temperature, unless heated by a source of steam other than that in the cooking chamber, drops to a temperature of about 200° F. If it is desired to cook the product carried by the short conveyor at a maximum temperature of 200° F., the lower ends of the U-shaped cooker housing 48 will be positioned about one foot below the water level W', and steam will be directed into the liquid cooking chamber 16 by a thermostatically controlled valved circuit 102 thereby maintaining the cooking temperature constant.

It is well known in the canning art that meats and most vegetables such as peas, beans and corn may be processed at high temperatures of about 240° to 275° F. for periods on the order of about 30 to 40 minutes, while it is desirable to cook fruits such as applies, apricots, cherries, and fruit salads at much lower temperatures such as between about 180° F. and 200° F. for periods of about 4 to 8 minutes. The apparatus of the present invention is designed to simultaneously handle both of the above types of products, i.e., both fruits and vegetables, even though the optimum cooking temperatures may differ up to about 95° F.

In describing the operation of the double chain hydrostatic cooker 10, it will be assumed that a canner desires to process peas packed in No. 10 cans (6$\frac{3}{16}$ inches in diameter times 7 inches long) at a temperature of about 250° F. for a period of about 40 minutes, and also desires to process fruit salads in No. 2 cans (3$\frac{7}{16}$ inches in diameter times 4$\frac{9}{16}$ inches long) at 200° F. for six minutes. The steam in the steam chamber 14 will be raised to temperature of about 250° F. and a corresponding pressure of about 15.3 p.s.i. gauge. The temperature in the water chamber 16 will be maintained at 200° F. by steam from thermostatically controlled conduit 102, the temperature in the inlet leg 12 will be thermostatically controlled by steam from conduits 94, 96 and 98 to provide a temperature which gradually increases from about 160° F. at the upper end thereof to about 180° F. at the lower end thereof. Similarly, cooling water is introduced into the upper end of the discharge leg 18 through conduit 99, and a controlled amount of hot water is drained from the valved conduit 100 to provide a gradually decreasing temperature gradient in the leg 18 which varies from about 180° F. at the lower end thereof to about 86° F. at the upper end.

The motors M and M' are then started and are adjusted to drive the conveyors 22 and 24 at speeds which will provide sufficient residence time to cook and sterilize the two products. Rows of the large No. 10 containers C filled with peas are then moved into the carrier bars 60 at the feed station FS and are moved by the conveyor 22 into and through the inlet leg 12 during which time the containers are gradually raised in temperature. The containers are then advanced into and through the 250° F. steam atmosphere in the cooking chamber 14, are then cooled and moved out of the cooker through the cooling water in the discharge leg 18, and are subsequently discharged from the conveyor 22 at the discharge station DS. Simultaneously with the above high temperature treatment of the No. 10 cans, rows of the smaller No. 2 cans C'', which cans are filled with fruit salad, are deflected into the carriers 84 of the short conveyor 24 at the feed station FS'. The containers are then moved through the inlet leg 12, moved through the 200° water in the hot water cooking chamber 16 where they are cooked and sterilized, are moved through the outlet leg 18 where they are cooled, and are subsequently discharged from the cooker at discharge station DS'. In this way, containers of two different sizes and containers containing two different products may be simultaneously processed for the optimum cooking periods for both products by the double chain cooker of the present invention.

It is also to be noted that the pressure acting upon the external surfaces of containers C' or C'' while they are passing through the hot water in the cooking chamber 16 is substantially equal to the superatmospheric pressure in the steam chamber 14 which pressure is considerably higher than the pressure inside of the containers due to the formation of steam or condensible gases therein. In this regard, the 200° F. water in the water cooking chamber 16 will rise the temperature of the product within the container to approximately 200° F. thereby causing the pressure of condensible gases or steam within the containers C' or C'' to rise to about 2.5 p.s.i.g.

It is well known that cooking gases also form within the containers, and that the pressure of the cooking gases plus the pressure of the condensible vapors within the containers will exceed the pressure outside the containers if the cooking medium is saturated steam. Thus, wide mouth glass jars and thin walled aluminum or plastic containers may not be processed within a saturated steam atmosphere unless subjected to an overriding pressure. In accordance with the present invention, if the cooking water within the hot water cooking chamber 16 is maintained at 200° F. and the temperature within the steam chamber is 250° F. (15.3 p.s.i.g.), it will be appreciated that the containers within the hot water cooking chamber 16 will be subjected to a total pressure of about 15.3 p.s.i.g. or an overriding pressure of about 12.8 p.s.i.g. since the internal vapor pressure within the containers is about 2.5 p.s.i.g. Such overriding pressure is sufficient to exceed the total internal pressure within the containers and will thus permit products hermetically sealed in wide mouth glass jars, or hermetically sealed in thin walled aluminum or flexible containers to be moved through the cooker by the short conveyor 24 without damage to the containers due to excessive internal pressures.

Although the preferred cooking temperature within the cooking chamber 16 is about 200° F. as above described, it will be understood that the temperature at the upper end of the chamber 16 may be raised by injection of steam or the like to about 210° F. without altering the apparatus in any way. If a temperature above the boiling point of water at atmospheric pressure is desired, a valve V in the upper end of the vent pipe 50 may be closed, or partially closed to allow accumulated steam to gradually bleed therefrom, thus permitting the chamber 16 to remain completely filled with water and yet permitting the temperature thereof to be raised as high as that of the gaseous heat treatment medium.

A second embodiment of the double chain hydrostatic cooker 10a of the present invention is diagrammatically illustrated in FIG. 4. The cooker 10a is substantially the same as the cooker 10 and, accordingly, only the differences between the two cookers will be described in detail. Parts of the cooker 10a that are similar to the cooker 10 will be assigned the same numerals followed by the letter *a*.

The cooker 10a is identical to the cooker 10 except that the inverted U-shaped cooker housing 48 and vent pipe 50 are omitted, and the short conveyor 24a is trained along a horizontal cooking path 105 near the bottom of the trough 20a, which trough 20a defines the hot water cooking chamber. Thus, if a canner desires to simultaneously cook peas at 250° F. as above described; and a high acid product such as strawberries, pickles, orange juice or pineapple juice at about 185° F. for about 30 minutes, the peas are loaded on the conveyor 22a and pass through steam chamber 14a and the high acid product is loaded on the conveyor 24a and is moved along the horizontal path 105 through the hot water in the trough 20a which trough defines the hot water cooking chamber 16a. It will be noted that the containers moving along the path 105 will be subjected to an overriding pressure, that is, a pressure in excess of the steam pressure within the container. This overriding pressure is even greater than the overriding pressure applied to the containers passing through the hot water cooking chamber 16 of the first embodiment of the invention. The total pressure acting on the external surfaces of the container will, of course, be equal to the sum of the steam or steam-air pressure within the steam chamber 14a plus the pressure exerted by the head of water measured from water level W' acting on the containers.

From the foregoing description it will be apparent that the hydrostatic cooker of the present invention provides a pair of hydrostatic legs communicating with a steam cooking chamber maintained at one cooking temperature and with a water cooking chamber maintained at a different cooking temperature. One processing conveyor continuously advances rows of containers through the water legs and the steam chamber at an appropriate speed to cook and sterilize one type of food product hermetically sealed in the container, while a second processing conveyor simultaneously advances rows of filled containers, which may be of a different size, through the water legs and through the water cooking chamber at an appropriate speed to cook and sterilize a different type of food product hermetically sealed in the second containers. Also, since the second containers are subjected to an overriding pressure, thin walled aluminum or flexible containers or wide mouth glass jars, for example, may be processed in the hot water cooking chamber. The use of a steam-air mixture, rather than saturated steam in the steam chamber, also permits processing of thin walled metal containers or wide mouth glass jars in the steam chamber.

Although the best mode contemplated for carrying out the present invention has been herein shown and described, the subject matter which is regarded as the invention is set forth in the appended claims.

What is claimed is:

1. A hydrostatic cooker for simultaneously cooking different types of food products in containers comprising a liquid filled hydrostatic inlet leg; a liquid filled hydrostatic discharge leg; a cooking chamber communicating with said inlet and discharge legs and filled with a liquid heated to a first predetermined cooking temperature; a steam chamber communicating with said inlet and discharge legs and filled with a gaseous heat treatment medium maintained at a superatmospheric pressure and at a temperature different from said predetermined temperature; a short conveyor for advancing containers filled with a first product through said inlet leg, said liquid filled cooking chamber, and said discharge leg; and a long conveyor for advancing containers filled with a second product through said inlet leg, said steam chamber, and said discharge leg.

2. An apparatus according to claim 1 wherein the superatmospheric pressure within the steam chamber acts upon the heated liquid within the liquid cooking chamber for providing an overriding pressure thereon for preventing the pressure formed within the containers from exceeding the pressure acting on the external surfaces of the containers.

3. An apparatus according to claim 1 wherein said liquid cooking chamber projects upwardly above the lower level of liquid in said hydrostatic legs and into said steam chamber.

4. An apparatus according to claim 3 wherein said liquid cooking chamber includes an inverted U-shaped wall which is insulated and which has its lower ends projecting below the low liquid level of said hydrostatic legs.

5. An apparatus according to claim 3 wherein the temperature of the liquid within said liquid cooking chamber is maintained at about 200 to 212° F. and wherein the temperature of the heating medium in the steam chamber is maintained at about 250° F.

6. An apparatus according to claim 1 wherein drive means are provided to drive said short conveyor at one speed and said long conveyor at a different speed.

7. An apparatus according to claim 6 wherein said drive means are variable speed drive means.

8. An apparatus according to claim 7 wherein the superatmospheric pressure within the steam chamber acts upon the liquid within the liquid cooking chamber for providing an overriding pressure thereon for preventing the pressure formed within the containers from exceeding the pressure acting on the external surfaces of the containers.

9. An apparatus according to claim 1 wherein said short conveyor is provided with a plurality of spaced carriers for handling containers of one size, and wherein said long conveyor is provided with a plurality of spaced carriers for handling containers of a different size.

10. An apparatus according to claim 1 wherein means are provided for gradually increasing the temperature in the inlet leg to a temperature near that of the heat treatment medium in the steam chamber; and wherein means are provided in said discharge leg for gradually decreasing the temperature from a temperature near that of the heat treatment medium in said steam chamber to a temperature of about 85° F. to 100° F. at the upper end thereof.

11. An apparatus according to claim 1 wherein the temperature difference between said liquid in said cooking chamber and the gaseous heat treatment medium in said steam chamber is between about 50° F. to 95° F.

12. An apparatus according to claim 1 wherein means defining a vent pipe is connected to the upper end of said cooking chamber and projects upwardly to a height at least equal to that of said hydrostatic inlet and discharge legs to define a hydrostatic vent leg for said cooking chamber.

13. An apparatus according to claim 12 and additionally comprising valve means on the upper end of said vent pipe for partially closing said pipe thereby allowing said cooking chamber to remain filled with liquid and permit the liquid temperature within said cooking chamber to be raised to a temperature equal to that of said gaseous heat treatment medium.

14. A method of simultaneously sterilizing different types of food products in sealed containers comprising the steps of simultaneously advancing first containers having one type of food product therein and second containers having another type of food product therein through a liquid filled inlet hydrostatic leg having an upper liquid level and a lower liquid level, simultaneously moving said first containers through a liquid heat treatment medium maintained at a first cooking temperature while moving said second containers through a gaseous heat treatment medium maintained at a superatmospheric pressure and at a different temperature, and simultaneously moving said first and said second containers out of the associated cooking mediums through a liquid filled discharge hydrostatic leg.

15. A method according to claim 14 wherein the liquid within the inlet hydrostatic leg is heated to provide a temperature gradient therein which gradually increases from the upper to the lower end thereof, and wherein the liquid in the discharge hydrostatic leg is cooled to provide a gradually decreasing temperature from the lower end to the upper end.

16. A method according to claim 14 wherein the superatmospheric pressure of the gaseous heat treatment medium is applied to the first containers passing through the liquid heat treatment medium for subjecting the first containers to an overriding pressure.

17. A method according to claim 15 wherein the superatmospheric pressure of the gaseous heat treatment medium is applied to the first containers passing through the liquid heat treatment medium for subjecting the first containers to an overriding pressure.

18. A method according to claim 14 wherein the temperature of said gaseous heat treatment medium is about 50° F. to 75° F. higher than the temperature of the liquid heat treatment medium.

19. A method according to claim 17 wherein the gaseous heat treatment medium is steam and is maintained at about 250° F. and wherein the liquid heat treatment medium is water maintained at about 200° F. to 210° F.

References Cited
UNITED STATES PATENTS

| | | | |
|---|---|---|---|
| 1,584,397 | 5/1926 | Paxton | 99—214 |
| 3,286,619 | 11/1966 | Lee | 99—362 |
| 3,469,988 | 9/1969 | Yawger | 99—214X |

TIM R. MILES, Primary Examiner

U.S. Cl. X.R.

99—362, 363